United States Patent [19]
Dornbusch et al.

[11] Patent Number: 5,110,202
[45] Date of Patent: May 5, 1992

[54] SPATIAL POSITIONING AND MEASUREMENT SYSTEM

[75] Inventors: Andrew W. Dornbusch; Yvan J. Beliveau; Eric J. Lundberg; Timothy Pratt, all of Blacksburg, Va.

[73] Assignee: Spatial Positioning Systems, Inc., Blacksburg, Va.

[21] Appl. No.: 636,459

[22] Filed: Dec. 31, 1990

Related U.S. Application Data

[63] Continuation-in-part of Ser. No. 07/570,268, Aug. 17, 1990.

[51] Int. Cl.⁵ .................. G01C 1/03; G01C 3/00; G01C 5/00
[52] U.S. Cl. .................................. 356/1; 172/4.5; 356/4; 356/141; 356/152
[58] Field of Search ............... 356/1, 4, 141, 152; 172/4.5

[56] References Cited

U.S. PATENT DOCUMENTS

| | | | |
|---|---|---|---|
| 3,846,026 | 11/1974 | Waters | 356/152 |
| 4,218,834 | 8/1980 | Robertsson | 89/41.06 |
| 4,677,555 | 6/1987 | Goyet | 356/1 |
| 4,700,301 | 10/1987 | Dyke | 356/1 |
| 4,820,041 | 4/1989 | Davidson | 356/1 |
| 4,912,643 | 3/1990 | Beirxe | 356/1 |
| 4,943,158 | 7/1990 | Pertl ett al. | 356/4 |
| 4,981,353 | 1/1991 | Murakawa et al. | 356/1 |

*Primary Examiner*—Stephen C. Buczinski
*Attorney, Agent, or Firm*—Wegner, Cantor, Mueller & Player

[57] ABSTRACT

A spatial positioning and measurement system provides three-dimensional position and/or measurement information of an object using one or more fixed referent station systems, and one or more portable position sensor systems. Each fixed station produces at least one primary laser beam which is rotated at a constant angular velocity about a vertical axis. The primary laser beam has a predetermined angle of divergence or angle of spread which is inclined at a predetermined angle from the vertical axis. Each fixed station also preferably includes at least one reflective surface for generating a secondary laser beam.

The portable position sensor includes a light sensitive detector, computer, and a display. The light sensitive detector can be formed of at least one "axicon" which directs incoming light to a photosensitive detector. The photosensitive detector generates an electrical pulse when struck by crossing laser beam and sends this pulse to the computer. The computer time labels each received pulse, which corresponds to the time of a laser beam crossing the axicon.

For any point which is crossed by the two laser beams, a horizontal angle can be determined from the time difference between the time of crossing of the primary and reflected laser beam. Once these horizontal angles are known for three fixed referent stations, the point of intersection of three planes, and thus the three dimensional position of the point, is determined Q ^ A ^ C.

14 Claims, 11 Drawing Sheets

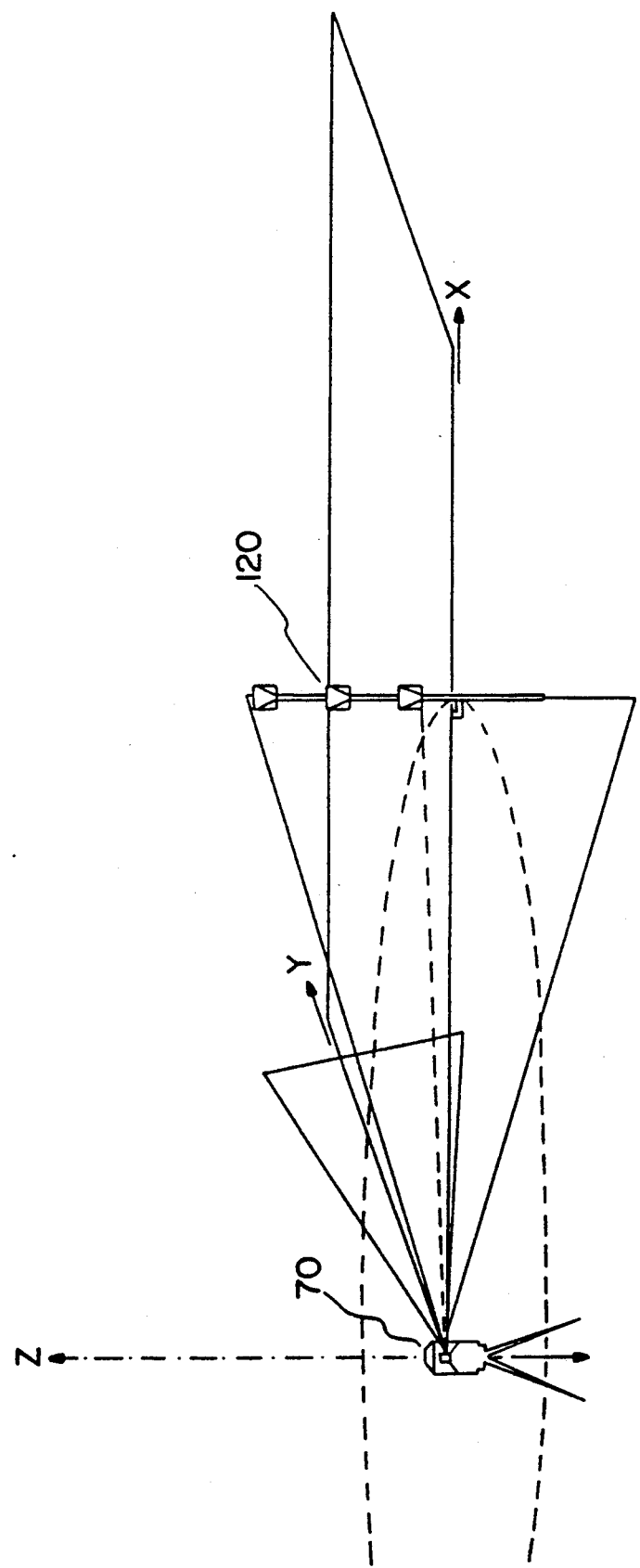
FIG. IC

SPATIAL POSITIONING AND MEASUREMENT SYSTEM

This application is a continuation-in-part of application Ser. No. 07/570,268, filed Aug. 17, 1990, which is incorporated herein by reference.

FIELD OF INVENTION

The present invention relates to a spatial positioning and measurement system and, more particularly, to a spatial positioning and measurement system which provides three-dimensional position and/or measurement information of an object using one or more fixed referent station systems, and one or more portable position sensor systems.

BACKGROUND OF THE INVENTION

In the Yvan J. Beliveau et al. invention ( U.S. patent application Ser. No. 07/570,268), a fixed referent station is used to produce a laser beam which is rotated at a constant angular velocity. When the rotating laser beam crosses a unique point in its rotation, this point being known as the rotation datum, a secondary transmitter such as a strobe transmitter is triggered. Alternatively, the secondary transmitter can be a radio transmitter. When triggered, the strobe transmitter broadcasts a signal which is received at the portable position sensor. The received signal is then translated into a time datum corresponding to the time which the rotating laser beam crossed its rotation datum. This time datum is the reference by which other time data are compared, in order to calculate horizontal and vertical angles of intersection.

The use of a secondary transmission system which is separate and unique from the rotating laser beam, as in the Beliveau et al. application, has certain disadvantages. First, a separate transmission system increases the complexity of the fixed referent station system which increases the cost and reduces the reliability of the positioning system. Second, if a radio transmitter is used as the secondary transmission source, a radio receiving system is required at the portable position sensor, which further increases the cost and reduces the reliability of the positioning system. Third, a sensor is required at the laser referent station which can be accurately triggered when the laser beam crosses the rotation datum. Each of these active components of the secondary transmission system contributes error to time measurements used for position calculations. The present invention eliminates the need for a secondary transmission system.

Additionally, as described in the Yvan J. Beliveau et al. application, the portable position sensor includes a laser detector having a flat disk with a photosensitive material on its outside circumference. A variation of this detector described in the Beliveau et al. application is a multi-faceted polygon having photosensitive material located on each facet. The present invention includes a simplified detector having a 360 degree lens and one small photodetector.

SUMMARY OF THE INVENTION

The present invention provides a spatial positioning and measurement system utilizing at least three fixed stations to determine the position of one or more portable position sensors.

Each fixed station produces a set or multiple sets of counter-rotating laser beams which rotate at a constant angular velocity. The use of reflective surfaces and the use of multiple rotating heads are two methods for producing counter-rotating laser beams. These methods are specifically described in this invention, however, any suitable method which produces counter-rotating laser beams may be used.

Each fixed station preferably includes a laser. The laser produces a primary laser beam which is rotated at a constant angular velocity about an axis. The primary laser beam has a predetermined angle of divergence or angle of spread which is inclined at a predetermined angle from the rotational axis. Each fixed station also preferably includes a reflective surface(s), which is fixed in the plane of rotation of the primary laser beam. When the rotation of the primary laser beam causes the beam to strike the reflective surface(s) a secondary laser beam is created. The secondary laser beam has the same divergence and inclination as the primary laser beam, but rotates in the opposite direction.

Alternatively, two rotating laser beams, primary and secondary, could be used which synchronously rotate in opposite directions. In this case, the secondary beam, produced directly from a rotating head, replaces the secondary laser beam produced by the reflection of the primary laser beam off a reflective surface(s), as described above.

For any point which is crossed by the two laser beams, primary and secondary, a horizontal angle can be determined from the time difference between the time of crossing of the primary and secondary laser beams. Once these horizontal angles are known for three fixed stations, the point of intersection of three planes, and thus the three dimensional position of the point, is determined.

The portable position sensor preferably includes a light sensitive detector (hereinafter called the "detector"), computer, and a display. The detector preferably includes a 360° conical lens or "axicon" which directs incoming light to a photosensitive detector. The detector preferably also includes a collimator, a condenser, an optical filter and a photodetector, all of which are aligned along an axis.

The detector generates an electrical pulse when struck by a crossing laser beam. This pulse is sent to the computer. The computer time labels each received pulse, which corresponds to the time of a laser beam crossing the detector. Once the computer has accepted, time-labeled and recorded a primary pulse and a secondary pulse from each fixed station, it can determine the three-dimensional position of the detector and present this information to an operator on the display or transfer the coordinate information directly to another computer for the control of autonomous functions.

An alternative embodiment includes two fixed stations of a design where each produces two primary laser beams (hereinafter called a "dual beam station"). The two primary laser beams are rotated about an axis. Each beam has a predetermined divergence in a particular plane, and these planes are inclined at different angles relative to the vertical axis. The two primary laser beams are separated by some horizontal angle, which creates a time period between when the two primary laser beams cross a particular point in space. A reflective surface(s) as in the previous embodiment is also included. The reflective surface(s) creates secondary laser beams which have the same inclination as their corresponding primary laser beams, but rotate in the opposite direction.

As in the previous embodiment described above, the horizontal angle to the portable position sensor is determined from the difference in time between strikes of a primary laser beam and its corresponding secondary beam at the detector. The vertical angle is determined from the difference in time between the primary beams striking the detector of the portable position sensor. Since both horizontal and vertical angles can be determined from each dual beam station, only two dual beam stations are required to provide three-dimensional position information for the portable position sensor.

Another alternative embodiment for spatial positioning uses only one of the dual beam stations to position a portable position sensor which has three detectors (hereinafter called a "base line position sensor"). The three detectors are aligned along an axis, a known distance apart, forming a base line. The horizontal angle to the base line and vertical angles to each of the three detectors determined as in the previous embodiments described above. However, in this method, the distance of the base line position sensor to the dual beam station can be determined through a reverse resection method using the vertical angles and the known distance between the detectors. Thus, instead of the common method of finding an unknown point from a fixed base line, this method finds the position of a vertical base line from a known point. The horizontal angle, vertical angle, and distance of the base line position sensor from the dual beam station form the three-dimensional spherical coordinates of the position. The spherical coordinates can be easily converted into cartesian coordinates.

BRIEF DESCRIPTION OF THE DRAWINGS

The above aspects of the present invention can be seen from the attached drawings, in which:

FIG. 1C is a schematic view illustrating three-dimensional sensing and positioning using one double laser fixed station and a portable base line in accordance with another preferred embodiment of the invention;

DETAILED DESCRIPTION OF THE PREFERRED EMBODIMENTS

Figure 1A:
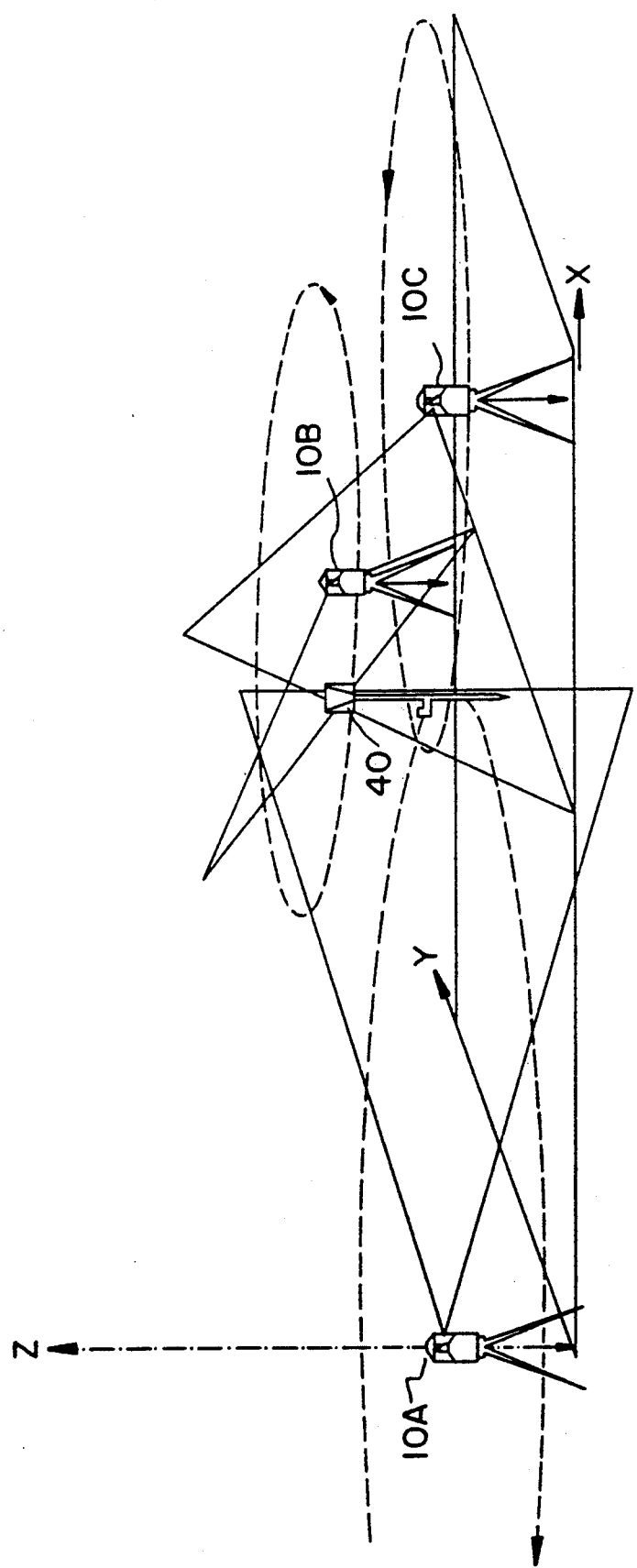
FIG. 1A is a schematic view illustrating three-dimensional sensing and positioning using three fixed stations in accordance with a preferred embodiment of the invention.

A spatial positioning system for three-dimensional positioning is schematically shown in FIG. 1A. The system includes preferably three fixed reflecting referent stations (hereinafter 10 "reflecting stations") 10A, 10B, and 10C, and a portable position sensor 40.

Figure 2:
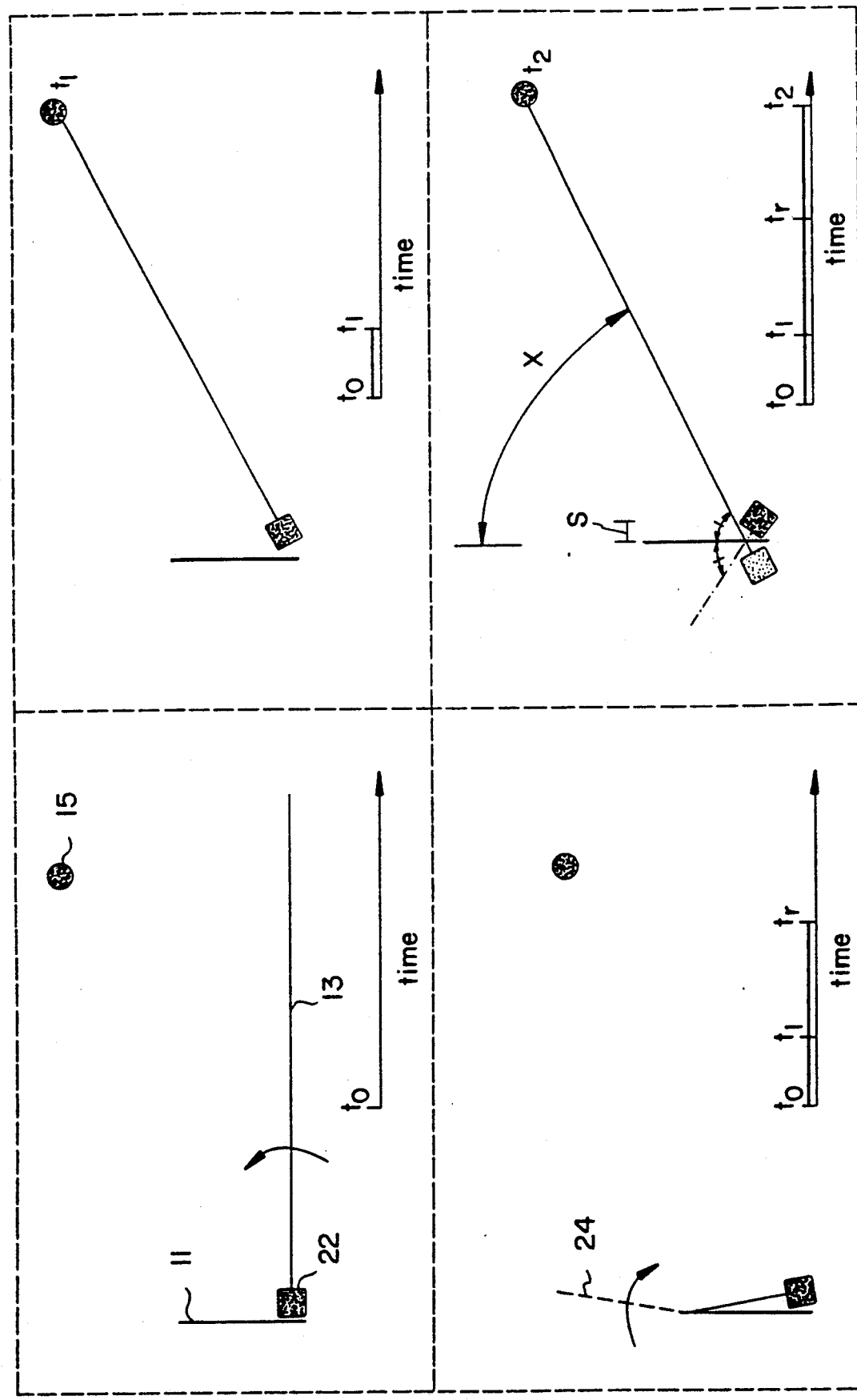
FIG. 2 is a partial top plan view of the rotating laser beam and a reflective surface for use with any of the preferred embodiments of the invention.
Figure 5:
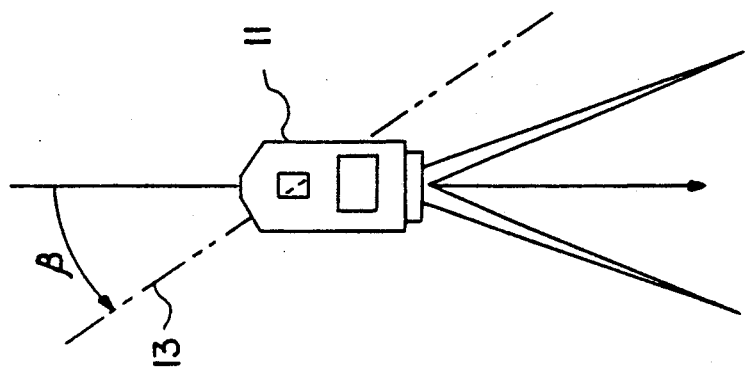
FIG. 5 is a schematic view of a fixed referent station with a reflective surface in accordance with any of the preferred embodiments of the invention.
Figure 4:
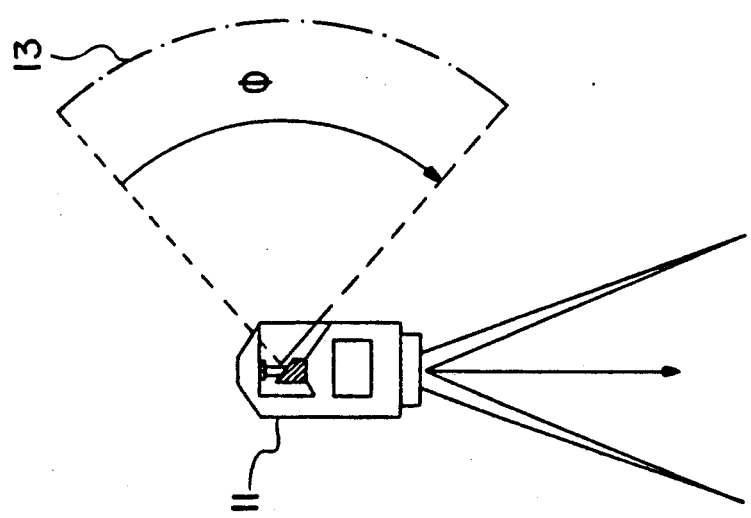
FIG. 4 is a schematic view of a fixed referent station with a reflective surface in accordance with any of the preferred embodiments of the invention.

As shown in FIG. 2, the reflecting station includes a reflective surface 11 which is placed behind the rotating prism 22. The prism 22 creates a single primary laser beam 13 (hereinafter the "primary beam") which is rotated about an axis. As shown in FIGS. 4 and 5, the primary beam 13 has an angle of divergence, $\phi$, in a plane which is inclined at an angle, $\beta$, from the rotational axis. When the rotation of the primary beam 13 causes the beam to strike the reflective surface 11, a secondary laser beam 24 is created. The reflected laser beam (hereinafter the "secondary beam") 24 has the same divergence, $\phi$, and inclination, $\beta$, as the primary beam 13, but it rotates in the opposite direction. For any point 15 which is crossed by both the primary and reflected beams 13, 24, the horizontal angle, X, can be determined, by the time difference between the time of crossing of the point by the two laser beams. An approximation of this angle can be expressed by Equation 1:

$$\left(\frac{t_1 - t_2}{2} + M\right) \times \frac{\omega}{2\pi} = X^\circ$$

$t_1$ = time of crossing of primary beam (13)
$t_2$ = time of crossing of secondary beam (24)
$\mu$ = offset factor
$\omega$ = speed of rotating laser (revs./sec.)
$X^\circ$ = horizontal angle from the fixed referent station to the portable position sensor The offset, $\mu$, is a function of the distance of the reflective surface(s) from the center of rotation of the prism 22.

Figure 8A:
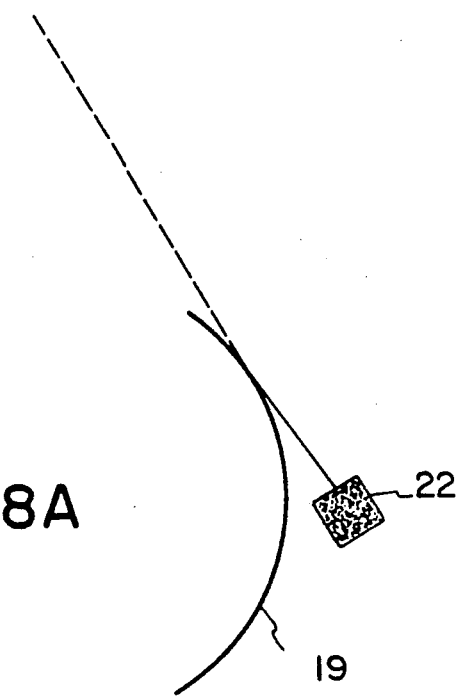
FIG. 8A, 8B and 8C are top plan views of the reflective surface in accordance with another preferred embodiment of the invention.
Figure 8B:
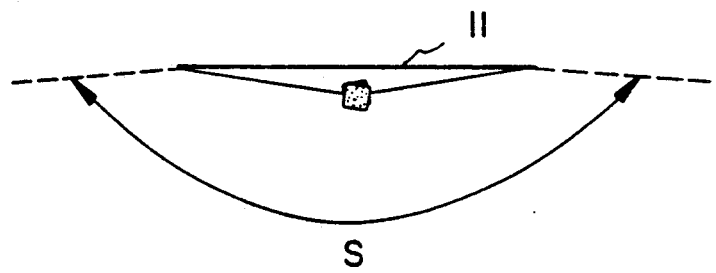
Figure 8C:
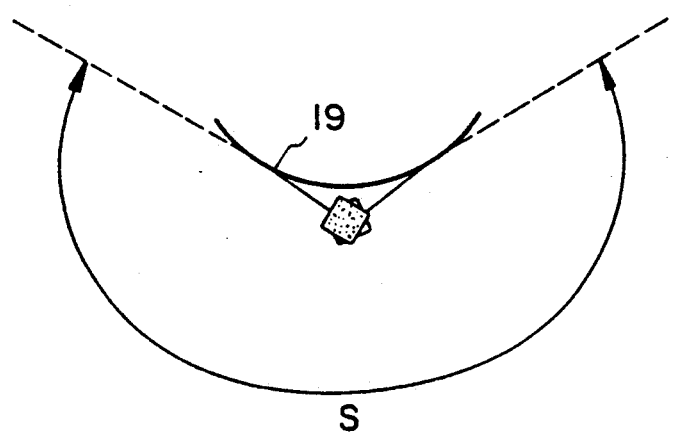

Alternatively, the reflective surface 11 may be curved as shown in FIGS. 8A, 8B and 8C. The curved reflective surface 19 can be used to increases the scan angle, S. The scan angle, S, is the horizontal angle which is swept by both the primary laser beam 13 and the secondary laser beam 24. FIGS. 8B and 8C show that the scan angle S is greater for a curved reflective surface than for a flat reflective surface(s).

Figure 6:
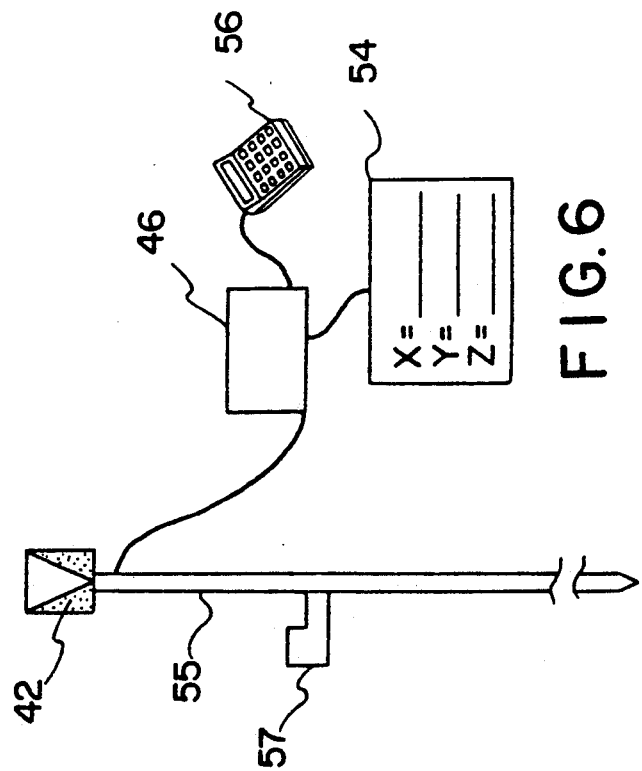
FIG. 6 is a schematic view of the portable position sensor with a detector in accordance with the first and second preferred embodiments of the invention.
Figure 10:
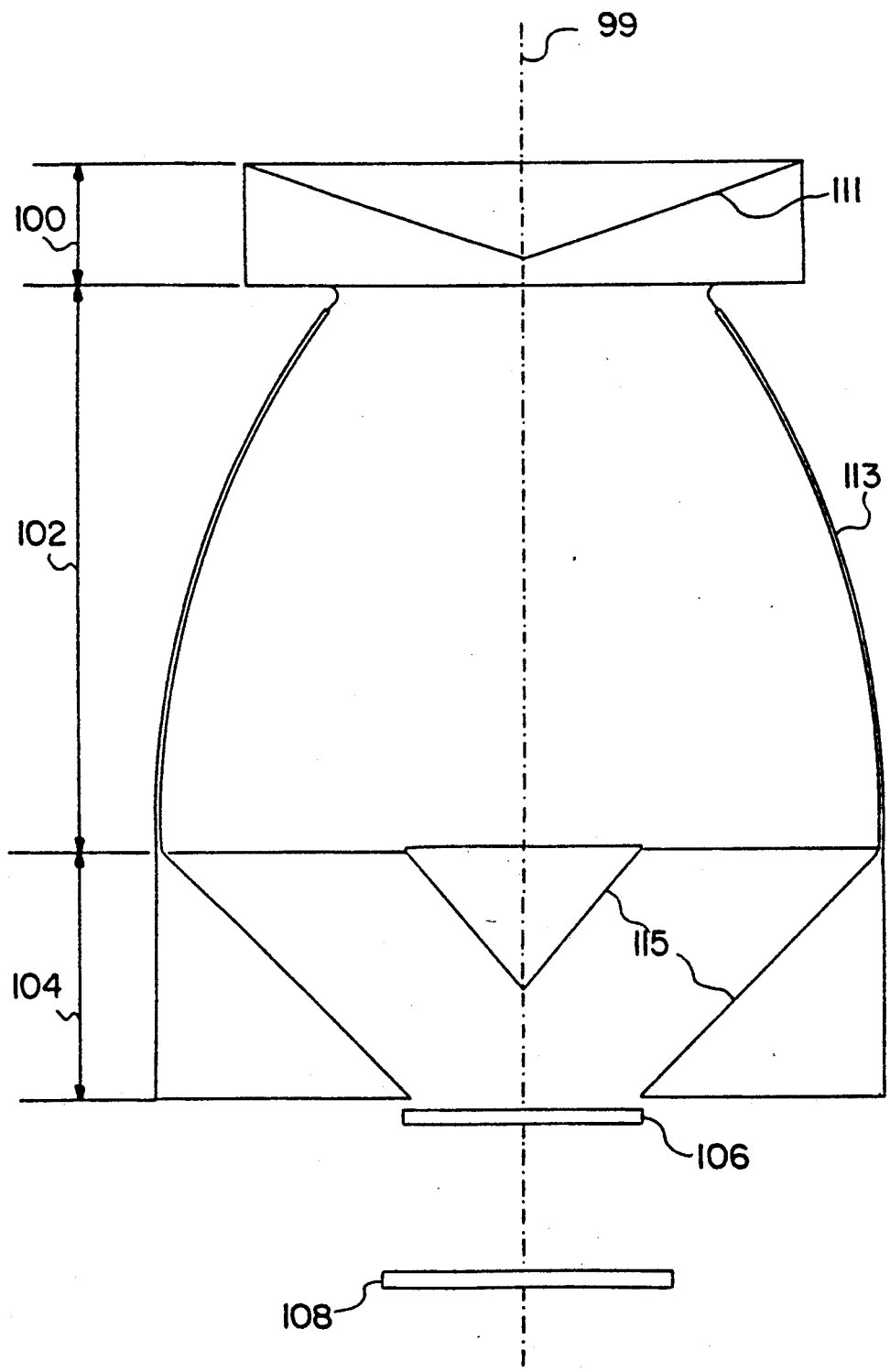
FIG. 10 is a cross-sectional view of the detector in accordance with another preferred embodiment of the invention.

The portable position sensor 40, as show in FIG. 6, preferably includes a 360° lens detector 42 to detect the presents of the laser beam, however, any suitable detector may be used. The 360° lens detector 42 preferably consists of an axicon 100, collimator 102, condenser 104, filter 106, and photodetector 108 which are aligned along an axis, as shown in FIG. 10. The axicon 100 receives light from any direction from a range of incoming angles off the horizontal plane and redirects this light into the collimator 102. The collimator 102 redirects the light from the axicon 100 so that the direction of this light is closer to a direction which is parallel to the axis 99 of the detector. The light then enters the condenser 104 where the light is brought closer to the axis 99 of the detector. This arrangement of optics allows efficient use of optical filters 106 (i.e. optical bandpass filters), which are sensitive to incidence of light, and also reduces the size of the photodetector 108 surface area required. A lens (not shown) could also be placed before the photodetector 108 to further reduce the surface area required.

The reflective surface 111 of the axicon 100 can be conical, spherical, parabolic or any other suitable shape. The reflective surface 113 of the collimator 102 is of a shape which complements the shape of the reflective surface 111 of the axicon 100 to achieve the desired result of making the direction of the light parallel to the axis 99 of the detector 42. The collimator 102 may also consist of a system of lenses. Any or all of the reflective surfaces 111, 113, 115 can be designed to employ internal reflection.

The photodetector 108 generates an electric pulse when a laser beam strikes its surface. This electric pulse is sent to a computer 46, via a communication link 48, and forms part of the information necessary to determine the position of the portable position sensor 40.

The computer 46, which can be of any suitable type, assigns a time label to each electrical pulse received from the detector 42. The computer generates the coordinates of the portable position sensor 40 through a series of mathematical algorithms. The portable position sensor 40 can be attached to a range pole 55 which is equipped with a bubble level 57. Thus, the computer 46 determines the position of the bottom of the vertically aligned range pole 55 by subtracting the length of the range pole 55 from the computed z-coordinate of the portable position sensor 40.

The computed position coordinates are preferably output to an electronic display 54 coupled to a computer 46. Input mechanism 56 is also preferably coupled to computer 46 to allow input of the positions of the fixed stations and to request various option in the software, such as system calibration discussed below. The input mechanism 56 is preferably a keyboard, although any other suitable input device may be used.

The positioning system includes a calibration sequence which may be followed to determine theloca- tion of the fixed stations. The calibration sequence determines the x, y, z coordinates and the pitch and roll of the fixed station 10A, 10B, 10C. The calibration sequence generates all necessary calibration information by successively placing the portable position sensor 40 in four points of known position. The computer records the timing information generated at the four known points. From this information the x, y, z coordinates and the pitch and roll of the each fixed station are calculated.

Figure 1B:
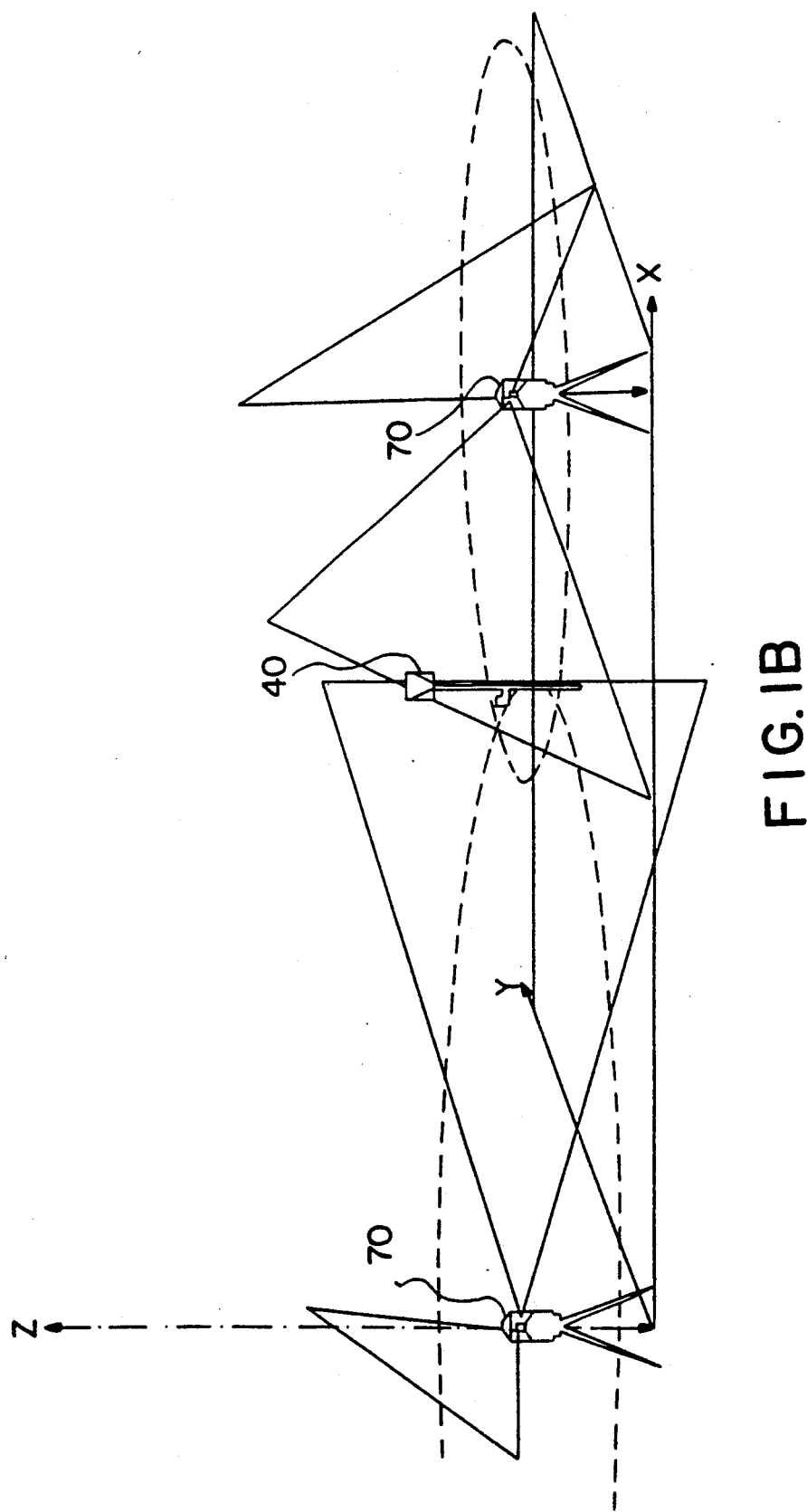
FIG. 1B is a schematic view illustrating three-dimensional sensing and positioning using two double laser referent stations in accordance with still another preferred embodiment of the invention.
Figure 3:
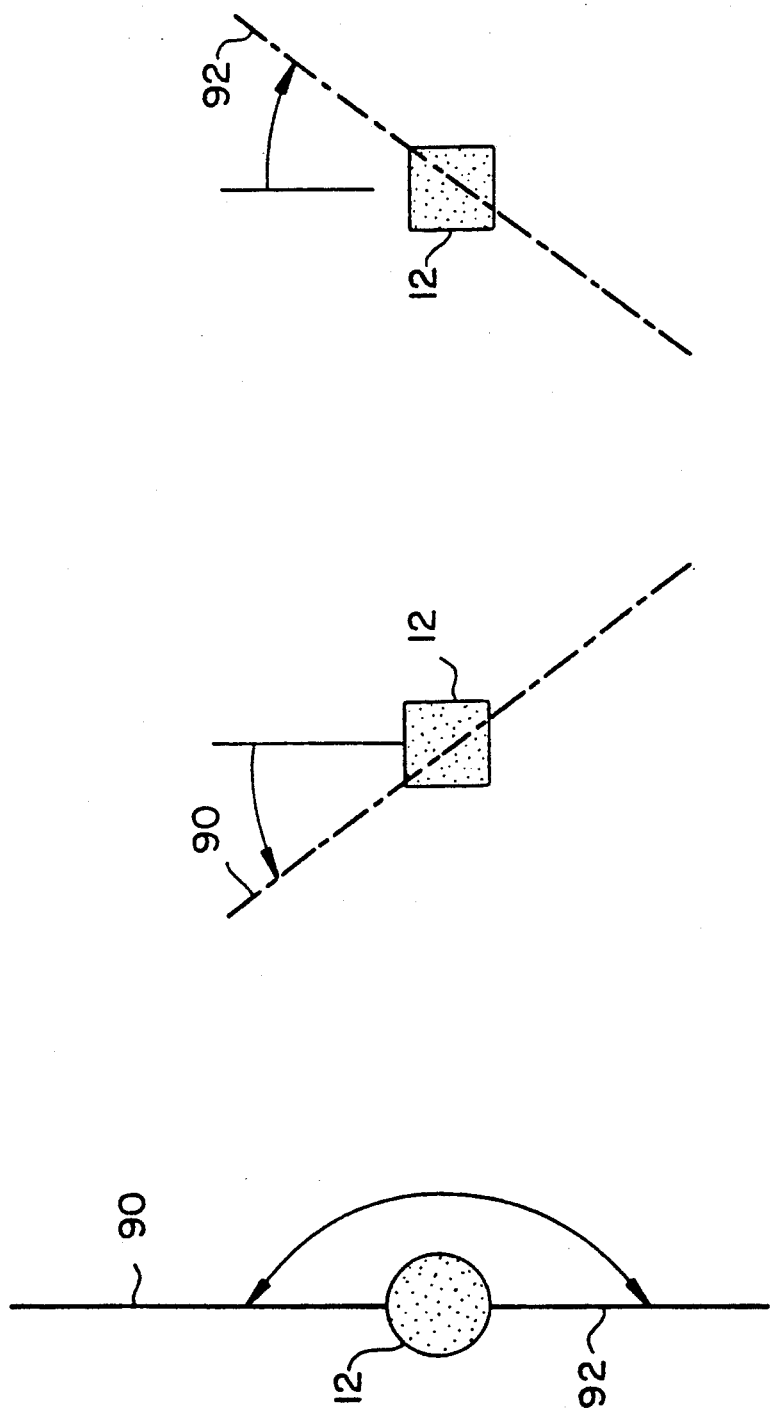
FIG. 3 includes a top plan view and two side views of the dual beam station in accordance with the first and second preferred embodiment of the invention.

In an alternative embodiment of the present invention, only two fixed referent stations are required to provide three dimensional positioning and measurement capability, as illustrated in FIG. 1B and FIG. 3. The fixed referent stations differ from the reflecting station described above in that two primary beams, 90, 92, are produced by the rotating prism 12. This type of fixed referent station having two primary beams and a reflective surface will be called the "dual beam station" 70. The two primary beams 90, 92 are inclined at opposite angles, $\beta$ and $\alpha$, from the axis of rotation, as shown in FIG. 3. The two laser beams are separated by some horizontal angle, $\gamma$, which creates a time period between when the two laser beams cross a particular point in space. Each of the primary beams 90, 92 produces a secondary beam, 94, 96, which is produced when the primary beams strike the reflective surface(s) 11.

Both horizontal and vertical angle measurements can be determined from the time information generated from one detector at the portable position sensor, from each dual beam station. An approximation of horizontal angle, X, is determined by equation 1, using either pair of primary and secondary beams. The vertical angle, V, is determine from the time different between the crossing of the two primary beams, 91, 92. An approximation of the vertical angle, V, is given by equation 2:

$$\tau = \left( \frac{\gamma - \omega(2\pi)(t_A - t_B)}{2} \right) \cot\beta$$

$\tau$ = vertical angle
$\gamma$ = horizontal angle offset of the primary beams, 90, 92
$\omega$ = rate of rotation (Rev./sec.)
$t_A$ = time primary beam 90 crosses the point
$t_B$ = time primary beam 92 crosses the point
$\beta$ = inclination of the beams.

Figure 7:
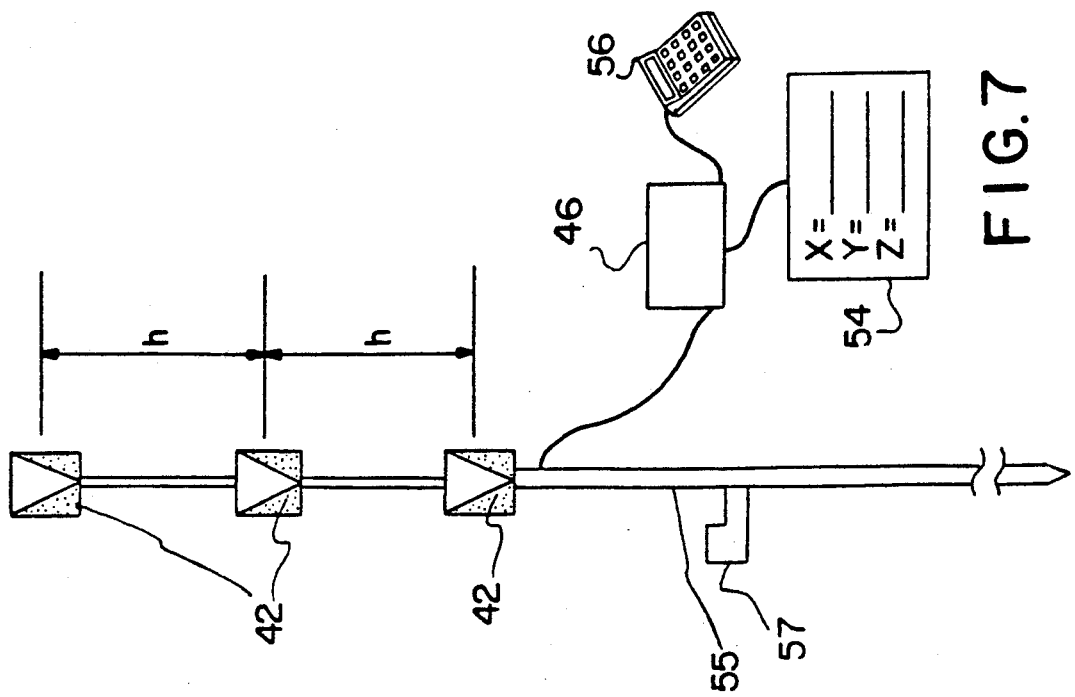
FIG. 7 is a schematic view of the base line position sensor in accordance with the third preferred embodiment of the invention.
Figure 9:
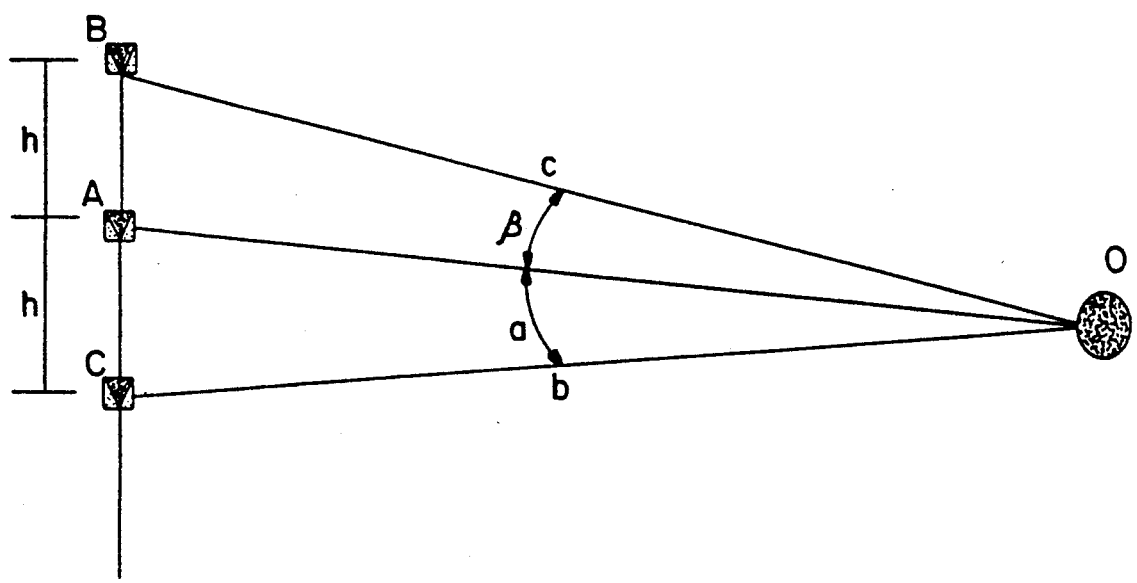
FIG. 9 is a schematic view of the base line position sensor in accordance with the third preferred embodiment of the invention.

A further preferred embodiment in accordance with the present invention, illustrated in FIG. 1C, requires only one dual beam station and a portable position sensor to provide three-dimensional position information. In this case, the portable position sensor (hereinafter a "base line position sensor") 120 includes three detectors 42, as shown in FIGS. 7 and 9. The detectors 42 are spaced at some distance, h, apart along the axis of the base line position sensor 120. The three detectors 42 form a base line. The horizontal angle is calculated using equation 1. The vertical angle to each of the detector 42 is calculated using equation 2. Once the vertical angle to each of the detectors 42 is known, the horizontal distance between the base line position sensor 120 and the dual beam station 70 can be determined through a reverse resection method.

Figure 11:
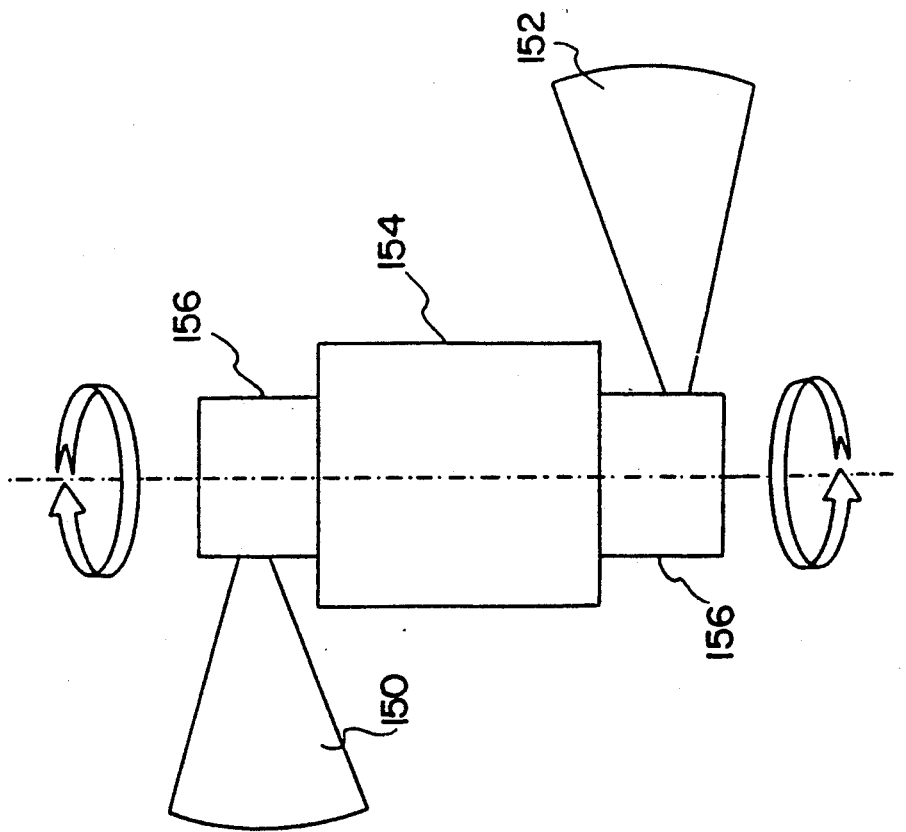
FIG. 11 is a schematic view of a rotatational platform in accordance with another preferred embodiment of the invention.

The reflecting stations 10A, 10B, and 10C can be replaced by a systems including two counter-rotating laser beams, as illustrated in FIG. 11. The primary beam 150 is the equivalent of the primary beam 13 of the reflecting stations 10A, 10B, and 10C in FIG. 1A. The secondary beam 152 is equivalent to the secondary beam 24 of the reflecting stations in FIG. 1A. The primary laser beam 150 and the secondary laser beam 152 are rotated about an axis at a constant angular velocity, but in opposite directions, by separate rotating optical heads 156. The rotating optical heads 156 are rotated by a motortransmission system 154.

Figure 12:
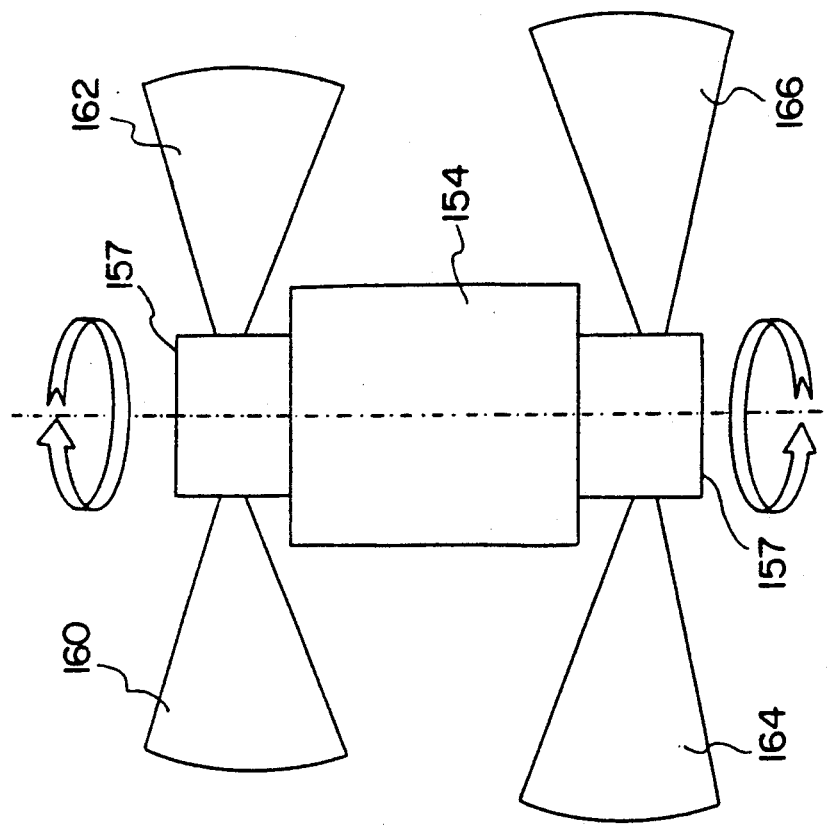
FIG. 12 is a schematic view of a rotational platform in accordance with another preferred embodiment of the invention.

The dual beam station 70 can be replaced by a system including two pairs of counter-rotating laser beams as illustrated in FIG. 12. Two primary beams 160 and 162 have all of the characteristics of the primary beams 90 and 92 of the dual beam station 70 in FIG. 1B. Two secondary beams 164 and 166 have all of the characteristics of the secondary beams 94, 96 of the dual beam station 70 in FIG. 1B. Optical rotating heads 157 generate the pairs of laser beams and counter-rotate at a constant angular velocity. The optical rotating heads 157 are rotated by a motor/transmission system 154.

The foregoing is for illustrative purposes only. Modifications can be made, particularly with regard to size, shape and arrangement of parts, within the scope of the invention as defined by the appended claims. For example, it is contemplated that the present invention can be used to provide a computer map of an existing structure, excavation site or the like.

We claim:

1. A spatial positioning and measurement system for determining the instantaneous x-y-z position of an object in a three-dimensional Cartesian coordinate system, comprising:

at least one fixed reference station, each said station emitting a primary laser beam having an angle of divergence $\phi$ and being about an axis at an angle of inclination $\beta$, each said station including at least one reflective surface for generating a secondary laser beam having said angle of divergence $\phi$ and being rotated in an opposite direction from said primary beam about said axis at said angle of inclination $\beta$;

a portable position sensor located at said object, said sensor including detector means for detecting said primary and reflected laser beams, said detector means emitting a signal indicating detection of a laser beam, said sensor also including at least one axicon for directing incoming light to said detector means; and a determination means for determining the position of the object based on the signals emitted from said detector means.

2. A system as claimed in claim 1, wherein three fixed reference stations are used.

3. A system as claimed in claim 2, wherein said determination means includes a computer which time-labels the detection of each primary and reflected laser beam detected by the detector and stores each said time-label in memory 4. A system as claimed in claim 3, wherein said determination means calculates the three-dimensional position of the sensor according to the following formulae:

$$\left(\frac{t_1 - t_2}{2} + M\right) \times \frac{\omega}{2\pi} = X \quad \text{(Eq. 1)}$$

5. A system as claimed in claim 1, wherein said reflector is curved.

6. A system as claimed in claim 1, wherein each said reference stations emits two primary laser beams.

7. A system as claimed in claim 6, wherein two such reference stations are used, and said determination means includes a computer which time-labels the detection of each primary and reflected laser beam detected by the detector and stores each said time-label in memory, wherein said computer calculates the three-dimensional position of the sensor according to the following formulae:

$$\tau = \left(\frac{\gamma - \omega(2\pi)(t_A - t_B)}{2}\right)\cot\beta \quad \text{(Eq. 2)}$$

8. A system as claimed in claim 6, wherein one such reference station is used, and said sensor includes three axicons for directed incoming light to three corresponding detectors means.

9. A method of determining relative spatial positioning in a three-dimensional Cartesian coordinate system, comprising:

emitting a divergent primary laser beam and rotating said primary laser beam about an axis at an angle of inclination $\beta$;

generating a divergent reflected laser beam and rotating said reflected laser beam in an opposite direction from said primary beam about said axis at said angle of inclination $\beta$;

directing incoming light from said primary and reflected laser beams to at least one photodetector via an axicon lens;

emitting a signal from said at least one detector corresponding to the detection of each of said laser beams;

time-labelling each detection of said laser beams at said at least one detector; and calculating the relative spatial positioning based on the signals emitted from said at least one detector.

10. A spatial positioning and measurement system for determining the instantaneous x-y-z position of an object in a three-dimensional Cartesian coordinate system, comprising:

at least one fixed reference station, each said reference station emitting at least one primary radiation beam having an angle of divergence and being rotated about an axis at an angle of inclination $\beta$, said reference station also emitting at least one secondary radiation beam having said angle of divergence and being rotated about said axis in an opposite direction from said primary beam at said angle of inclination $\beta$;

a portable position sensor located at said object, said sensor including detector means for detecting said primary and secondary beams and emitting a signal each time one of said beams is detected; and determination means for determining the position of the object based on the signals emitted from said detectors means.

11. A system as in claim 10, wherein said sensor includes at laest one axicon for directing incoming light to said detector means.

12. A system as in claim 10, wherein two primary beams and two secondary beams are emitted.

13. A system as in claim 10, wherein said station includes at least one reflective surface for generating said at least one secondary beam.

14. A system as in claim 13, wherein said surface is curved.

* * * * *